United States Patent
Ueda et al.

(10) Patent No.: US 7,714,096 B2
(45) Date of Patent: May 11, 2010

(54) RESIN COMPOSITION, CURED PRODUCT AND OPTICAL PARTS

(75) Inventors: Mitsuru Ueda, Tokyo (JP); Shinji Ando, Tokyo (JP); Jin-gang Liu, Tokyo (JP); Yuzi Shibasaki, Tokyo (JP); Yasuhiro Nakamura, Tokyo (JP); Shuichi Sugawara, Tokyo (JP); Miwa Ariyuki, Tokyo (JP); Yuichi Eriyama, Tokyo (JP); Keisuke Kuriyama, Tokyo (JP); Hideaki Takase, Tokyo (JP)

(73) Assignees: Tokyo Institute of Technology, Tokyo (JP); JSR Corporation, Tokyo (JP)

( * ) Notice: Subject to any disclaimer, the term of this patent is extended or adjusted under 35 U.S.C. 154(b) by 41 days.

(21) Appl. No.: 12/057,815

(22) Filed: Mar. 28, 2008

(65) Prior Publication Data

US 2008/0255284 A1    Oct. 16, 2008

(30) Foreign Application Priority Data

Mar. 30, 2007 (JP) .............................. 2007-091390

(51) Int. Cl.
*C08K 3/10* (2006.01)
*C08K 3/22* (2006.01)
*C08G 69/48* (2006.01)
*C08G 69/42* (2006.01)
*C08G 75/00* (2006.01)
*C08G 79/02* (2006.01)
*C08G 69/26* (2006.01)
*C08F 283/04* (2006.01)
*C09K 19/00* (2006.01)

(52) U.S. Cl. ................. 528/352; 524/413; 524/430; 524/431; 525/420; 525/426; 528/335; 528/337; 528/350; 528/353; 428/1.26

(58) Field of Classification Search ............... 524/413; 525/420, 426; 528/335, 337, 350, 352, 353
See application file for complete search history.

(56) References Cited

U.S. PATENT DOCUMENTS

| | | | | |
|---|---|---|---|---|
| 3,342,774 A | * | 9/1967 | Hoegger | 528/182 |
| 3,573,132 A | * | 3/1971 | Ducloux et al. | 156/307.3 |
| 4,405,770 A | * | 9/1983 | Schoenberg et al. | 526/259 |
| 4,481,339 A | * | 11/1984 | Bolon | 525/424 |
| 4,716,216 A | * | 12/1987 | Takekoshi et al. | 528/352 |
| 4,783,522 A | * | 11/1988 | Aritomi et al. | 528/352 |
| 5,004,800 A | * | 4/1991 | Terauchi et al. | 528/351 |
| 5,053,480 A | * | 10/1991 | Koto et al. | 528/188 |
| 5,194,566 A | | 3/1993 | Takekoshi et al. | |
| 5,422,034 A | * | 6/1995 | Hirai et al. | 252/299.01 |
| 6,329,058 B1 | | 12/2001 | Arney et al. | |
| 6,962,756 B2 | * | 11/2005 | Kihara et al. | 428/690 |
| 2005/0025976 A1 | | 2/2005 | Faris | |
| 2005/0065278 A1 | * | 3/2005 | Mercado et al. | 524/606 |
| 2006/0199920 A1 | * | 9/2006 | Okada et al. | 525/426 |

FOREIGN PATENT DOCUMENTS

| | | |
|---|---|---|
| EP | 0 294 848 A1 | 12/1988 |
| EP | 1 195 622 A1 | 4/2002 |
| EP | 1975192 A1 * | 10/2008 |
| JP | 5-263077 | 10/1993 |
| JP | 11-12465 | 1/1999 |
| JP | 2001-354853 | 12/2001 |
| JP | 2004-131684 | 4/2004 |
| JP | 2005-208465 | 8/2005 |
| WO | WO 2007/023998 A1 | 3/2007 |

OTHER PUBLICATIONS

Liu, J.G., Nakamura, Y., Shibasaki, Y., Ando, S., Ueda, M. Macromolecules, vol. 40, p. 4614-4620, May 31, 2007.*
Watanabe, Y., Sakai, Y., Shibasaki, Y., Ando, S., Ueda, M. Macromolecules, vol. 35, p. 2277-2281, Feb 16, 2002.*
Nishikawa, M., West, J.L., Reznikov, Y.U. Liquid Crystals, vol. 26, No. 4, p. 575-580, 1999.*
IUPAC. Compendium of Chemical Terminology, 2nd ed. (the "Gold Book"). Compiled by A. D. McNaught and A. Wilkinson. Blackwell Scientific Publications, Oxford (1997).*

* cited by examiner

*Primary Examiner*—Vasu Jagannathan
*Assistant Examiner*—Anthony H Sheh
(74) *Attorney, Agent, or Firm*—Oblon, Spivak, McClelland, Maier & Neustadt, L.L.P.

(57) ABSTRACT

It is provided for a resin composition including (A) at least one polyamic acid having the structure represented by the following formula (1):

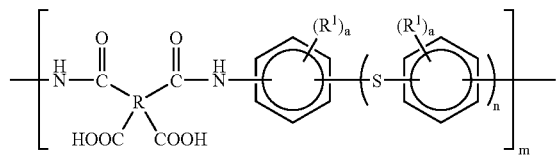

(1)

wherein $R^1$ is independently an alkyl group having 1 to 3 carbon atoms or a cyano group; a is independently an integer of 0 to 4; R is a tetravalent organic group; n is an integer of 1 to 4; and m is an integer of 1 to 100,000, and (E) an organic solvent.

18 Claims, 1 Drawing Sheet

RESIN COMPOSITION, CURED PRODUCT AND OPTICAL PARTS

TECHNICAL FIELD

The invention relates to a resin composition. In particular, it relates to a resin composition including a polyamic acid which gives a cured product having a high refractive index and is excellent in heat resistance, and a cured product obtained by curing the same.

BACKGROUND ART

Since polyimides have a large number of higher-order structures composed of cyclic structures such as a heterocyclic ring and aromatic ring, their molecular chains are hard to move at high temperatures. Due to a large number of higher-order bonds such as double bonds, they have large interatomic bonding energy. The heterocyclic ring and aromatic ring in a polyimide molecule interact with one another within the polymer molecule or between the polymer molecules to form a charge transfer complex, thereby to produce a large coagulation power. Therefore, they have the highest heat resistance in various plastics.

Furthermore, polyimides are excellent not only in heat resistance but also in mechanical properties and electric properties. Specifically, polyimides have high strength, high elasticity, high insulating properties and low dielectric properties. Polyimides are also excellent in chemical resistance, radiation resistance and flame retardance.

A photosensitive polyimide which has been developed recently has been used for a very large-scale integration semiconductor, a polyimide having toughness and strong adhesive force has been used for a launch vehicle, a polyimide having high transparency has been used for an optical communication device, and a polyimide having good injection molding property has been used for heat resistant sliding parts including automobile parts.

Application examples of polyimides having the above-mentioned properties in optical fields are given below: a polyimide prepared by reacting a dianhydride containing a sulfur atom with a diamine containing no sulfur atom is used for a light guide (see Patent Document 1); a polyimide prepared by reacting a dianhydride containing no sulfur atom with a diamine containing a sulfur atom is used for an alignment film of liquid crystal (see Patent Document 2); a mixture of a polyimide having a particular structure and titanium oxide particles is used for a high-refractive index material (see Patent Document 3); and a mixture of a polyamic acid containing no sulfur atom, titanium oxide particles and other particular compound is used for a positive type photosensitive resin composition (see Patent Document 4).

[Patent Document 1] JP-A-2004-131684
[Patent Document 2] JP-A-H05-263077
[Patent Document 3] JP-A-2001-354853
[Patent Document 4] JP-A-2005-208465

In the case where a sulfur atom is introduced into the dianhydride (Patent Document 1), the resultant polyimide has a refractive index of 1.67 to 1.72, but is insufficient in transparency at visible light wavelength (400 to 700 nm). In the case where the polyimide is used for an alignment film of liquid crystal (Patent Document 2), since attention is focused on the conductivity of the polyimide, no reference is made to the refractive index. The invention disclosed in Patent Document 3 uses the polyamic acid prepared by reacting a specific dianhydride with a specific diamine. The diamine used in the invention disclosed in Patent Document 3 has a specific structure in which benzene rings are bonded mainly by an ether group (—O—), and Patent Document 3 discloses only two kinds of diamines having one thioether group (—S—).

DISCLOSURE OF THE INVENTION

An object of the invention is to provide a resin composition which gives a cured film composed mainly of an imidization polymer having a high refractive index, excellent transparency, and excellent heat resistance.

In order to achieve the above-mentioned object, the inventors made intensive studies, and found that by the combination of an aromatic diamine having a sulfur atom introduced into a specific position and an aliphatic or alicyclic tetracarboxylic dianhydride, it is possible to obtain an imidization polymer having a high refractive index and high transparency, and is excellent in heat resistance. The invention was accomplished on the basis of this finding.

Namely, the invention provides the following resin composition, a cured product obtained by curing the same, and an optical part formed by the cured product.

1. A resin composition comprising:
    (A) at least one polyamic acid having the structure represented by the following general formula (1):

wherein $R^1$ is independently an alkyl group having 1 to 3 carbon atoms or a cyano group; a is independently an integer of 0 to 4; R is a tetravalent organic group; n is an integer of 1 to 4; and m is an integer of 1 to 100,000, and
    (E) an organic solvent.
2. The resin composition according to 1 above wherein R is selected from the group consisting of tetravalent alicyclic groups and tetravalent aliphatic groups.
3. The resin composition according to 1 or 2 above, wherein R is selected from the group consisting of tetravalent organic groups containing a sulfur atom.
4. The resin composition according to any one of 1 to 3 above, wherein the composition further comprises (B) particles which are formed mainly of an oxide of an element belonging to Group IV in the periodic table and have a primary particle size within a range of 1 to 100 nm.
5. The resin composition according to 4 above, wherein the particles of the component (B) are formed of titanium oxide or zirconium oxide.
6. The resin composition according to 4 above, wherein the particles of the component (B) are formed of titanium oxide coated with silicon oxide.
7. The resin composition according to any one of 1 to 6 above, wherein the composition further comprises (C) a surfactant.
8. The resin composition according to any one of 1 to 7 above, wherein the composition further comprises (D) an imidization catalyst.
9. The resin composition according to 8 above, wherein the (D) imidization catalyst is a photo acid generator or a photo base generator.

10. The resin composition according to any one of 1 to 9 above, wherein the composition further comprises a polyamic acid other than the polyamic acid having the structure represented by the general formula (1).
11. A cured film obtainable by heating the resin composition according to any one of 1 to 10 above.
12. The cured film according to 11 above, wherein the refractive index measured at a temperature of 25° C. at a wave length of 633 nm is 1.60 or higher.
13. A cured film comprising an imidization polymer having the structure represented by the following general formula (2):

(2)

wherein $R^1$ is independently an alkyl group having 1 to 3 carbon atoms or a cyano group; a is independently an integer of 0 to 4; R is a tetravalent organic group; n is an integer of 1 to 4; and m is an integer of 1 to 100,000.
14. An optical part made of the cured film according to any one of 11 to 13 above.
15. The optical part according to 14 above, for a condensing material of a solid-state image sensing device.
16. The optical part according to 14 above, for a condensing material of a recording disk.

According to the invention, a high refractive index (refractive index of up to 1.76 at a wavelength of 633 nm) and excellent heat resistance are achieved by the use of the aromatic diamine into which sulfur atoms are introduced.

According to the invention, the resin composition suitable for use as an optical part that requires a high refractive index, high transparency, and excellent heat resistance can be provided.

Furthermore, the resin composition of the invention allows the cured product to have a higher refractive index by addition of metal nano particles having a high refractive index.

According to the invention, an optical part having a high refractive index, and is excellent in transparency and heat resistance can be provided.

BEST MODE OF CARRYING OUT THE INVENTION

I. Resin Composition

The resin composition of the invention (hereinafter referred to as "the composition of the invention") can contain the following components (A) to (F). Of these, the components (A) and (E) are essential components, and the other components are optional components which can be added as required.
(A) At least one polyamic acid having the structure represented by the following general formula (1):

(1)

wherein $R^1$ is independently an alkyl group having 1 to 3 carbon atoms or a cyano group; a is independently an integer of 0 to 4; R is a tetravalent organic group; n is an integer of 1 to 4; and m is an integer of 1 to 100,000.
(B) Particles formed mainly of an oxide of an element belonging to Group IV in the periodic table, and having a primary particle size within a range of 1 to 100 nm
(C) Surfactant
(D) Imidization catalyst
(E) Organic solvent
(F) Additives
Now, each component is explained below.

(A) Polyamic Acid Having the Structure Represented by the General Formula (1)

The polyamic acid as an essential component in the composition of the invention has the structure represented by the general formula (1), and its own refractive index (measured at a temperature of 25° C. at a wavelength range of 400 to 700 nm) is very high. A cured product having a high refractive index, and is excellent in transparency and heat resistance can be formed from the polyamic acid.

(1)

In the formula (1), $R^1$ is independently an alkyl group having 1 to 3 carbon atoms or a cyano group, and a is the number of substituent $R^1$ and independently an integer of 0 to 4. a is preferably 0 (namely, no $R^1$ is substituted), or $R^1$ is a cyano group and a is preferably 1.

R is a tetravalent organic group, specifically corresponds to a residue left after removing anhydride groups from an aliphatic, alicyclic or aromatic tetracarboxylic dianhydride. R is preferably a moiety derived from an alicyclic tetracarboxylic dianhydride or an aliphatic tetracarboxylic dianhydride to obtain a cured product which is excellent in transparency. Also, R preferably contains a sulfur atom since a high refractive index can be obtained.

n is an integer of from 1 to 4 and preferably an integer of 2 to 4.

m is an integer of 1 to 100,000 and preferably an integer of 10 to 10,000.

(a) Preparation of Polyamic Acid Having the Structure Represented by General Formula (1)

The component (A) in the invention can be obtained by the reaction of a diamine represented by the following general formula (3) with a tetracarboxylic dianhydride represented by the following general formula (4).

In the formulae (3) and (4), $R^1$, R, a and n are as explained in the general formula (1), and the explanations about them are omitted here.

(b) Diamine Represented by General Formula (3)

Examples of the diamine represented by the general formula (3) include 4,4'-(p-phenylenedisulfanyl)dianiline, 1,3-bis(4-aminophenysulfanyl)benzene, 1,3-bis(4-aminophenolsulfanyl)-5-cyanobenzene, 4,4'-thiobis[(p-phenylenesulfanyl)aniline], and 4,4'-bis(4-aminophenylsulfanyl)-p-dithiophenoxybenzene. Of these 4,4'-thiobis[(p-phenylenesulfanyl)aniline] is preferable.

Here, the composition of the invention may contain a polyamic acid other than the above-mentioned polyamic acid having the structure represented by the general formula (1). Namely, in addition to the above-mentioned diamine represented by the general formula (3), a diamine containing no sulfur atom may be used in combination insofar as the advantageous effects of the invention are not impaired. The diamines containing no sulfur atom include p-phenylenediamine, m-phenylenediamine, 4,4'-diaminodiphenylmethane, 4,4'-diaminodiphenylethane, 4,4'-diaminodiphenyl sulfide, 4,4'-diaminodiphenyl sulfone, 4,4'-diaminodiphenyl ether, 1,5-diaminonaphthalene, 3,3-dimethyl-4,4'-diaminobiphenyl, 4,4'-diaminobenzanilide, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenylenediisopropylidene)bisaniline, and 4,4'-(m-phenylenediisopropylidene)bisaniline Further, in addition to the above-mentioned diamines containing no sulfur atom, an aromatic diamine containing a hetero atom such as diaminotetraphenyl thiophene; an aliphatic or alicyclic diamine such as 1,1-methaxylylene diamine, 1,3-propane diamine, tetramethylene diamine, pentamethylene diamine, hexamethylene diamine, heptamethylene diamine, octamethylene diamine, nonamethylene diamine, 4,4-diaminoheptamethylene diamine, 1,4-diaminocyclohexane, isophorone diamine, tetrahydrodicyclopentadienylene diamine, hexahydro-4,7-methanoindanylene dimethylene diamine and tricyclo[6,2,1,0$^{2.7}$]-undecylene dimethyl diamine may be used in combination.

Among the diamines used for preparation of the polyamic acid as the component (A) the ratio of the diamine represented by the general formula (3) is preferably 50 mole % or more, more preferably 80 mole % or more. The ratio is particularly preferably 100 mole % in order to attain high refractive index.

(c) Tetracarboxylic Dianhydride Represented by the General Formula (4)

The acid anhydride used in the invention is represented by the above-mentioned general formula (4). In the formula (4), R corresponds to a residue left after removing anhydride groups from the tetracarboxylic dianhydride. Such a compound includes aliphatic, alicyclic and aromatic tetracarboxylic dianhydrides. Of these, alicyclic tetracarboxylic dianhydrides and aliphatic tetracarboxylic dianhydrides are preferred since the resultant cured film has excellent transparency.

Examples of aliphatic and alicyclic tetracarboxylic dianhydride include butanetetracarboxylic dianhydride, 1,2,3,4-cyclobutanetetracarboxylic dianhydride, 1,2,3,4-cyclopentanetetracarboxylic dianhydride, 4,10-dioxatricyclo[6.3.1.0$^{2,7}$]dodecan-3,5,9,11-tetraone, 1,2,4,5-cyclohexane tetracarboxylic dianhydride, 2,3,5-tricarboxycyclopentyl acetic dianhydride, 3,5,6-tricarboxynorbornane-2-acetic dianhydride, 2,3,4,5-tetrahydrofurane tetracarboxylic dianhydride, 1,3,3a,4,5,9b-hexahydro-5-tetrahydro-2,5-dioxo-3-furanyl)-naphtho[1,2-c]-furan-1,3-dione, 5-(2,5-dioxotetrahydrofuranyl)-3-methyl-3-cyclohexen-1,2-dicarboxylic dianhydride, and bicyclo[2,2,2]-oct-7-ene-2,3,5,6-tetracarboxylic dianhydride. Of these, butane tetracarboxylic dianhydride, 1,2,3,4-cyclobutane tetracarboxylic dianhydride, 4,10-dioxatricyclo[6.3.1.0$^{2,7}$]dodecan-3,5,9,11-tetraone, 2,3,5-tricarboxycyclopentyl acetic dianhydride, 5-(2,5-dioxotetrahydrofuranyl)-3-methyl-3-cyclohexene-1,2-dicarboxylic dianhydride, and 1,3,3a,4,5,9b-hexahydro-5-tetrahydro-2,5-dioxo-3-furanyl)-naphtho[1,2-c]-furan-1,3-dione are preferred, and 1,2,3,4-cyclobutane tetracarboxylic dianhydride, 4,10-dioxatricyclo[6.3.1.0$^{2,7}$]dodecan-3,5,9,11-tetraone, and 1,2,4,5-cyclohexane tetracarboxylic dianhydride are particularly preferred.

Specific examples of the aromatic tetracarboxylic dianhydride include pyromellitic dianhydride, 3,3',4,4'-benzophenone tetracarboxylic dianhydride, 3,3',4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furane tetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 4,4'-(hexafluoroisopropylidene)bis(phthalic acid) dianhydride, 3,3',4,4'-biphenyl tetracarboxylic dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride and bis(triphenylphthalic acid)-4,4'-diphenylmethane dianhydride. Of these, pyromellitic dianhydride, 3,3',4,4'-benzophenone tetracarboxylic dianhydride, 3,3',4,4'-biphenylsulfone tetracarboxylic dianhydride, 4,4'-(hexafluoroisopropylidene)

bis(phthalic acid) dianhydride, and 3,3',4,4'-biphenyl tetracarboxylic dianhydride are preferred.

Further, it is preferable to use a tetracarboxylic dianhydride containing a sulfur atom since a polyamic acid having a higher refractive index can be obtained. As an example of the sulfur atom-containing tetracarboxylic dianhydride, 4,4'-[p-thiobis(phenylenesulfanyl)]diphthalic anhydride may be mentioned.

(d) Reaction of Diamine Represented by General Formula (3) with Tetracarboxylic Dianhydride Represented by General Formula (4)

In general, by mixing with stirring a diamine compound and an acid dianhydride in an aprotic organic solvent such as N-methyl-2-pyrrolidone, the polyamic acid of component (A) in the form of a solution can be obtained. For instance, a diamine compound is dissolved in an organic solvent, and an acid dianhydride may be added thereto, followed by mixing with stirring, or a mixture of a diamine compound and an acid dianhydride may be added to an organic solvent, followed by mixing with stirring. The reaction is carried out usually at a temperature of 100° C. or lower, preferably 80° C. or lower at a normal pressure. However, the reaction may be carried out under increased pressure or reduced pressure as required. Although the reaction time varies depending upon the kinds of the diamine compound, the acid dianhydride and the organic solvent used, the reaction temperature, etc. it is usually within a range of 4 to 24 hours.

The amount of the component (A) in the composition of the invention is usually within a range of 10 to 100% by weight, preferably 20 to 80% by weight, more preferably 30 to 70% by weight, relative to the total solid content of the composition excluding the organic solvent being 100% by weight. When the amount of the component (A) is less than 10° by weight, refractive index or heat resistance may be insufficient.

Here, although the essential component of the composition of the invention is actually the component (A) alone, the composition usually contains the organic solvent used for the preparation of the component (A) and preferably contains the organic solvent in view of its coating property.

(B) Particles Formed Mainly of Oxide of Element Belonging to Group IV in Periodic Table, and Having a Primary Particle Size within a Range of 1 to 100 nm The component (B) is oxide particles of a Group IV element in the periodic table. Addition of particles having a high refractive index allows the resultant cured product to have an increased refractive index.

The primary particle size of the component (B) is needed to be within a range of 1 to 100 nm, preferably within a range of 1 to 50 nm, and more preferably within a range of 5 to 15 nm. When the primary particle size is smaller than 1 nm, secondary aggregation tends to occur and the cured film may whiten. If it exceeds 100 nm, surface evenness at the time of forming a film may be impaired. Here, the primary particle size can be measured by a light scattering method.

The oxide particles used as the particles of the component (B) include particles of titanium oxide, zirconium oxide and hafnium oxide, and composite particles thereof with particles of silicon oxide or tin oxide. Titanium oxide and zirconium oxide are preferred in view of the effect of increasing the refractive index of the resultant cured product.

Since titanium oxide has photocatalytic activity, it is difficult to use in optical applications. Therefore, it is preferable to coat the surface of titanium oxide particles with silicon oxide.

Further, titanium oxide is divided into anatase type and rutile type depending upon the crystal form, and rutile type is preferred since it has a high refractive index and excellent light resistance.

The oxide particles used as the component (B) may be in the form of powder or a solvent dispersion sol. The dispersion medium includes methanol, methyl ethyl ketone, methyl isobutyl ketone, cyclohexanone, N-methyl-2-pyrrolidone, and propylene glycol monomethyl ether.

Examples of commercially available particles used as the component (B) include silicon oxide-coated anatase type titanium oxide-methanol dispersion sol (Optorake series, manufactured by Catalyst & Chemicals Ind. Co., Ltd.), silicon oxide-coated tin oxide-containing rutile type titanium oxide-methanol dispersion sol (TS series, manufactured by TAYKA Corporation), and zirconium oxide-methyl ethyl ketone dispersion sol (HXU-120JC, manufactured by Sumitomo Osaka Cement Co., Ltd.).

The amount of the component (B) in the composition of the invention is usually within a range of 0 to 90% by weight, preferably 20 to 80% by weight, and more preferably 40 to 60% by weight, relative to the total amount of the solid content of the composition excluding the organic solvent being 100% by weight. When the content of the component (B) exceeds 90% by weight, heat resistance may be insufficient.

Here, when the component (B) is a solvent dispersion sol, the amount of the component (B) does not include the amount of the dispersion medium.

(C) Surfactant

When the composition of the invention is applied on a substrate or the like by a spin coat method, it is preferable to add a surfactant to the composition since an even coating film can be obtained.

Usable surfactants in the invention include polydimethylsiloxane type surfactants and fluorinated type surfactants, with the polydimethylsiloxane type surfactants being preferable.

Examples of the polydimethylsiloxane type surfactants include SH28PA (manufactured Dow Corning Toray Co., Ltd., dimethylpolysiloxane-polyoxyalkylene copolymer), Paintad 19, 54 (manufactured by Dow Corning Toray Co., Ltd., dimethylpolysiloxane-polyoxyalkylene copolymer), FM0411 (Silaplane, manufactured by Chisso Corporation), SF8428 (manufactured Dow Corning Toray Co., Ltd., dimethylpolysiloxane-polyoxyalkylene copolymer (containing OH at the side chain)), BYK UV3510 (manufactured by BYK Japan KK, dimethylpolysiloxane-polyoxyalkylene copolymer), DC57 (manufactured Dow Corning Toray Co., Ltd., dimethylpolysiloxane-polyoxyalkylene copolymer), DC190 (manufactured by Dow Corning Toray Silicone Co., Ltd., dimethylpolysiloxane-polyoxyalkylene copolymer), Silaplane FM-4411, FM-4421, FM-4425, FM-7711, FM-7721, FM-7725, FM-0411, FM-0421, FM-0425, FM-DA11, FM-DA21, FM-DA26, FM0711, FM0721, FM-0725, TM-0701 and TM-0701T (manufactured by Chisso Corporation, UV3500, UV3510 and UV3530 (manufactured by BYK Japan KK), BY16-004 and SF8428 (manufactured by Dow Corning Toray Silicone Co., Ltd.), and VPS-1001 (manufactured by Wako Pure Chemicals Co., Ltd.). In particular, Silaplane FM-7711, FM-7721, FM-7725, FM-0411, FM-0421, FM-0425, FM0711, FM0721, FM-0725 and VPS-1001 are preferred. Further, as a commercial product of the silicon compound having an ethologically unsaturated group, for example, Tego Rad 2300, and 2200N (manufactured by Tego Chemie Service GmbH) may be mentioned.

Examples of the fluorinated surfactants include Megafac F-114, F410, F411, F450, F493, F494, F443, F444, F445, F446, F470, F471, F472SF, F474, F475, R30, F477, F478, F479, F480SF, F482, F483, F484, F486, F487, F172D, F178K, F178RM, ESM-1, MCF350SF, BL20, R08, R61 and R90 (manufactured by Dainippon Ink and Chemicals Incorporated).

The amount of the component (C) in the composition of the invention is usually within a range of 0 to 10% by weight, preferably 0.5 to 5% by weight, and more preferably 0.5 to 3% by weight, relative to the total solid content of the composition excluding the organic solvent being 100% by weight. When the amount of the component (C) exceeds 10% by weight, the refractive index of the cured product may decrease.

(D) Imidization Catalyst

The composition of the invention is cured by a reaction in which the component (A) of a polyamic acid is changed by heating to an imidization polymer. Therefore, an imidization catalyst may be added to accelerate this heat curing reaction.

As the imidization catalyst, for example, a mixture solution of acetic anhydride-pyridine may be mentioned. Also, a mixture solution of acetic anhydride-triethylamine, trifluoroacetic anhydride and dicyclohexylcarbodiimide can be used.

Further, by using as the component (D) a photo acid generator or photo base generator, which generates an acid or a base by exposure to the light, the composition of the invention may become a material capable of being patterned. This enables the composition of the invention to be used for preparing optical parts, such as a light condensing part of a solid-state image sensing device, which needs a patterning step.

As the photo base generator, for example, carbamate type photo base generator may be mentioned. Specific examples of the photo base generator include the compound represented by the following structural formula:

[Structural formulas of two carbamate photo base generator compounds]

The amount of the component (D) in the composition of the invention is usually within a range of 0 to 20% by weight, preferably 1 to 10% by weight, and more preferably 1 to 5% by weight, relative to the total solid content of the composition excluding the organic solvent being 100% by weight. When the amount of the component (D) exceeds 20% by weight, storage stability of the composition may deteriorate.

(E) Organic Solvent

The composition of the invention usually contains the solvent used in the preparation of the component (A) of a polyamic acid. When a solvent dispersion sol of the particles is used as the component (B) of oxide particles, the dispersion medium is also included in the composition of the invention.

Furthermore, organic solvents other than the dispersion medium may be added to the composition of the invention in order to adjust viscosity of the composition and to improve application properties of the composition required for forming a uniform coating film.

The organic solvent used in the invention is not particularly limited, but aprotic organic solvents are preferred. AS the aprotic organic solvent, N-methyl-2-pyrrolidone (NMP), dimethylformamide (DMF), cyclohexanone, and N,N-dimethylacetamide (DMAc) are preferred. In addition to those organic solvent, or the like N,N-dimethylformamide, N,N-diethylacetamide, N,N-dimethylacetamide, 1,3-dimethyl-2-imidazolidinone, N,N-dimethoxyacetamide, N-methylcaprolactam, 1,2-dimethoxyethane, 1,2-diethoxyethane, bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, pyrroline, picoline, dimethyl sulfoxide, dimethyl sulfone, tetramethyl urea, hexamethyl phosphoramide, phenol, o-cresol, m-cresol, p-cresol, m-cresylic acid, p-chlorophenyl, anisole, benzene, toluene and xylene may also be used. These organic solvent may be used alone or in a mixture of two or more kinds.

The amount of the component (E) of organic solvent in the composition of the invention is usually within a range of 100 to 9900 parts by weight, preferably 300 to 1900 parts by weight, and more preferably 400 to 1900 parts by weight, relative to 100 parts by weight of the total solid content of the composition excluding the organic solvent. When the amount of the organic solvent is less than 100 parts by weight, application by a spin coating method may become impossible, and when exceeds 9900 parts by weight, necessary film thickness may not be achieved.

Here, the amount of the component (E) includes the solvents incorporated into the composition of the invention from the solvent of the polyamic acid solution as the component (A) and the dispersion medium of the oxide particle dispersion sol as the component (B).

(F) Additives

Various kinds of additives may be added to the composition of the invention within a range that the advantageous effects of the invention are not impaired. Such additives include curable compounds other than the above-mentioned component, and an antioxidant.

The curable compounds include heat-curable compounds and photo-curable compounds. By addition of these compounds, it is possible to increase hardness of the resultant cured product.

The heat-curable compound includes melamine compounds, and alkoxysilanes.

The photo-curable compound includes compounds having a (meth)acryloyl group, and compounds having a vinyl group.

II. Cured Product

The cured product of the invention is characterized by including the imidization polymer having the structure represented by the following general formula (2).

In the formula (2), $R^1$, a, R, n and m are the same as in the general formula (1), so the explanations thereof are omitted here.

The cured product is obtained by applying the above-mentioned composition of the invention on a substrate or the like, followed by heating under a nitrogen atmosphere at a temperature of 80 to 300° C. for 1 to 5 hours so that the polyamic acid (A) in the composition is changed into the imidization polymer having the structure represented by the above-mentioned general formula (2).

The cured product of the invention has a refractive index at a wavelength of 633 nm of usually 1.60 or higher, preferably 1.68 or higher, and more preferably 1.70 or higher, even when oxide particles of the component (B) are not contained.

The thickness of the cured film of the invention should be selected depending upon its use, but it is usually within a range of 0.1 to 5 μm, preferably 0.1 to 2 μm, and more preferably 0.1 to 1 μm in view of transparency of the cured film. When the film thickness is less than 0.1 μm, it may be difficult to form a film, and when it exceeds 5 μm, color development due to the presence of a sulfur atom may be observed and the transparency may decrease.

The cured product of the invention is suitable as optical parts for which a high refractive index, excellent transparency and excellent heat resistance are required. As the optical parts formed from the cured product of the invention, a light condensing material for a solid-state image sensing device and a light condensing material for recording discs, etc. may be mentioned.

By the addition of a photo acid generator or a photo base generator as the imidization catalyst to the composition of the invention, patterning of the cured film becomes possible, whereby micro lenses or the like can be prepared. Preparation of Micro Lenses can be Carried Out by a conventionally known method.

EXAMPLES

Now, the invention will be more concretely described with reference to examples, but it should be understood that the invention is not restricted by these examples at all.

Synthesis Example 1

4,4'-(p-phenylene disulfanyl)dianiline

Into a reaction vessel equipped with a stirrer, a reflux condenser, a Dean-Stark trap and a nitrogen gas-introduction tube, p-aminothiophenol (25 g, 0.20 mol), anhydrous potassium carbonate (14.37 g, 0.104 mol), 1,3-dimethyl-2-imidazolizinon (DMI) (48 mL) and toluene (50 mL) were added and charged, and reaction was carried out at a temperature of 140° C. for four hours. Water was removed by the Dean-Stark trap, and toluene was distilled off under reduced pressure. The reaction solution was cooled to a temperature of 120° C., and a solution of 1,4-dicyclobenzene (11.76 g, 0.08 mol) in DMI (32 mL) was added dropwise thereto. After completion of the dropwise addition, the reaction solution was reacted at a temperature of 170° C. for 12 hours. Then, the reaction solution was poured into cooled water (1 L), and yellow precipitated substance was collected by filtration, followed by washing with water. The resultant yellow solid was purified by recrystallization from ethanol.

Yield: 24.6 g

Percent yield: 75.8%

Melting point: 164.9° C. (DSC)

FT-IR (KBr, cm$^1$): 3417.2, 3316.9, 1627.6, 1589.0, 1496.5, 1288.2, 1172.5, 1095.4, 825.4

$^1$H-NMR (300 MHz, DMSO-d$_6$, ppm): 5.39 (s, 4H), 6.60-6.63 (d, 4H), 6.96-6.97 (d, 4H), 7.13-7.16 (d, 4H)

$^{13}$C-NMR (300 MHz, DMSO-d$_6$, ppm): 150.6, 137.6, 136.7, 128.4, 116.5, 115.8

Elemental analysis:

Calculated value $C_{18}H_{16}N_2S_2$: C, 66.63%; H, 4.97%; N, 8.63%.

Found value C, 66.42%; H, 5.11%; N, 8.47%.

Synthesis Example 2

1,3-bis(4-aminophenylsulfanyl)benzene

Into a reaction vessel equipped with a stirrer, a reflux condenser, a Dean-Stark trap and a nitrogen gas-introduction tube, p-aminothiophenol (25 g, 0.20 mol), anhydrous potassium carbonate (14.37 g, 0.104 mol), 1,3-dimethyl-2-imidazolidinone (DMI) (48 mL) and toluene (50 mL) were added and charged, and the reaction was carried out at a temperature of 140° C. for four hours. Water was removed by the Dean-Stark trap, and toluene was distilled off under reduced pressure. The reaction solution was cooled to a temperature of 120° C., and a solution of 1,3-dichlorobenzene (11.76 g, 0.08 mol) in DMI (32 mL) was added dropwise thereto. After completion of the dropwise addition, the reaction solution was reacted at a temperature of 170° C. for 12 hours. Then, the reaction solution was poured into cooled water (1 L), and yellow precipitated substance was collected by filtration, followed by washing with water. The resultant yellow solid was purified by recrystallization from ethanol.

Yield: 17.7 g

Percent yield: 68.2%

Melting point: 110.0° C. (DSC)

FT-IR (KBr, cm$^{-1}$): 3424.9, 3340.1, 1619.9, 1565.9, 1496.5, 1465.6, 1288.2, 1172.5, 1118.5, 825.4

$^1$H-NMR (300 MHz, DMSO-d$_6$, ppm): 5.44 (s, 4H), 6.60-6.63 (m, 5H), 6.72-6.75 (m, 2H), 7.09-7.12 (m, 5H)

Elemental analysis:

Calculated value $C_{18}H_{16}N_2S_2$: C, 66.63%; H, 4.97%; N, 8.63%.

Found value C, 66.44%; H, 5.08%; N, 8.52%.

Synthesis Example 3

1,3-bis(4-aminophenylsulfanyl)-5-cyanobenzene

Into a reaction vessel equipped with a stirrer, a reflux condenser, a Dean-Stark trap and a nitrogen gas-introduction tube, p-aminothiophenol (25 g, 0.20 mol), anhydrous potassium carbonate (14.37 g, 0.104 mol), 1,3-dimethyl-2-imidazolidinone (DMI) (48 mL) and toluene (50 mL) were added and charged, and the reaction was carried out at a temperature of 140° C. for four hours. Water was removed by the Dean-Stark trap, and toluene was distilled off under reduced pressure. The reaction solution was cooled to a temperature of 120° C., and a solution of 3,5-dichlorobenzenenitrile (13.76 g, 0.08 mol) in DMI (32 mL) was added dropwise thereto. After completion of the dropwise addition, the reaction solution was reacted at a temperature of 170° C. for 12 hours. Then, the reaction solution was poured into cooled water (1 L), and yellow precipitated substance was collected by filtration, followed by washing with water. The resultant yellow solid was purified by recrystallization from ethanol.

Yield: 20.2 g
Percent yield: 72.1%
Melting point: 184.5° C. (DSC)
FT-IR (KBr, cm$^{-1}$): 3432.7, 3347.8, 2229.3, 1627.6, 1596.8, 1550.5, 1496.5, 1411.6, 1288.2, 1172.5, 825.4, 671.1
$^1$H-NMR (300 MHz, DMSO-d$_6$, ppm): 5.56 (s, 4H), 6.63-6.66 (d, 4H), 6.77-6.78 (s, 1H), 7.05-7.13 (m, 6H)
Elemental analysis:
Calculated value C$_{19}$H$_{15}$N$_3$S$_2$: C, 65.30%; H, 4.33%; N, 12.02%.
Found value C, 65.14%; H, 4.67%; N, 11.86%.

Synthesis Example 4

4,4'-bis(4-nitrophenylsulfanyl)diphenyl sulfide

Into a reaction vessel equipped with a stirrer, a reflux condenser and a nitrogen gas-introduction tube, p-chloronitrobenzene (13.86 g, 0.088 mol), 4,4'-thiobisbenzenethiol (10.02 g, 0.04 mol), anhydrous potassium carbonate (12.72 g, 0.092 mol) and N,N-dimethylformamide (DMF) (100 mL) were added and charged, and the reaction was carried out within a temperature range of 130 to 140° C. for 6 hours. DMF was distilled off under reduced pressure, the residual substance was poured into cooled water (0.5 L), and yellow precipitated substance was collected by filtration, followed by washing with water. The resultant yellow solid was purified by recrystallization from 2-methoxyethanol.

Yield: 16.9 g
Percent yield: 86.1%
Melting point: 137-138° C. (DSC)
FT-IR (KBr, cm$^{-1}$): 1581.3, 1511.9, 1342.2, 1079.9, 1010.5, 848.5, 740.5
$^1$H-NMR (300 MHz, DMSO-d$_6$, ppm): 7.38-7.40 (d, 4H), 7.49-7.51 (d, 4H), 7.57-7.59 (d, 4H), 8.15-8.17 (d, 4H)
Elemental analysis:
Calculated value C$_{24}$H$_{16}$N$_2$O$_4$S$_3$: C, 58.52%; H, 3.27%; N, 5.69%.
Found value C, 58.96%; H, 3.60%; N, 5.67%.

Synthesis Example 5

4,4'-thiobis[(p-phenylenesulfanyl)aniline]

Into a reaction vessel equipped with a stirrer, a reflux condenser and a nitrogen gas-introduction tube, 4,4'-bis(4-nitrophenylsulfanyl)diphenyl sulfide (13.7 g, 0.028 mol) synthesized in Synthesis Example 4, dehydrated ethanol (100 mL) and 10% palladium-activated carbon (1.20 g) were added and charged, and refluxed under heating. Then, hydrazine monohydrate (60 mL) and dehydrated ethanol (20 mL) were added dropwise thereto over a period of 1.5 hours, and the reaction solution was refluxed under heating for 6 hours. The reaction solution was subjected to heat filtration to collect yellow precipitated substance, followed by washing with ethanol. The resultant yellow solid was purified by recrystallization from ethanol.

Yield: 10.2 g
Percent yield: 84.0%
Melting point: 142-143° C. (DSC)
FT-IR (KBr, cm$^{-1}$): 3428.8, 3382.5, 1619.9, 1592.9, 1496.5, 1473.3, 1292.0, 1176.4, 1099.2, 1010.5, 825.4
$^1$H-NMR (300 MHz, DMSO-d$_6$, ppm): 5.46 (s, 4H), 6.62-6.64 (d, 4H), 6.98-7.01 (d, 4H), 7.15-7.19 (m, 8H)
Elemental analysis:
Calculated value C$_{24}$H$_{20}$N$_2$S$_3$: C, 66.63%; H, 4.66%; N, 6.48%.
Found value C, 66.59%; H, 4.77%; N, 6.34%.

Synthesis Example 6

4,4'-bis(4-aminophenylsulfanyl)-p-dithiophenoxybenzene

Into a reaction vessel equipped with a stirrer, a reflux condenser and a nitrogen gas-introduction tube, p-dibromobenzene (47.18 g, 0.20 mol), p-chlorothiophenol (10.02 g, 0.04 mol), anhydrous potassium carbonate (12.72 g, 0.092 mol) and N,N-dimethylformamide (DMF) (100 mL) were added and charged, and the reaction was carried out within a temperature range of 130 to 140° C. for 6 hours. DMF was distilled off under reduced pressure, the residual substance was poured into cooled water (0.5 L), and yellow precipitated substance was collected by filtration, followed by washing with water. The resultant yellow solid was purified by recrystallization from 2-methoxyethanol.

Yield: 50.86 g

Percent yield: 70.0%

To the resultant yellow solid (36.33 g, 0.10 mol), p-aminothiophenol (25.03 g, 0.2 mol), anhydrous potassium carbonate (12.72 g, 0.092 mol) and N,N-dimethylformamide (DMF) (100 mL) were added, and reacted within a temperature range of 130 to 140° C. for 6 hours. Precipitated yellow solid was collected by filtration, followed by washing with water. The resultant yellow solid was purified by recrystallization from ethanol.

Yield: 44.34 g

Percent yield: 82.0%

Synthesis Example 7

4,4'-[p-thiobis(phenylene-sulfanyl)]diphthalic anhydride

Into a reaction vessel equipped with a stirrer, a reflux condenser and a nitrogen gas-introduction tube, 4,4'-thiobisbenzenethiol (5.00 g, 0.02 mol), 4-bromophthalic anhydride (10.00 g, 0.044 mol), anhydrous potassium carbonate (6.08 g, 0.044 mol) and N,N-dimethylformamide (DMF) (100 mL) were added and charged, and the reaction was carried out at a temperature of 120° C. for 12 hours. The reaction solution was cooled to room temperature, and white solid was collected by filtration, followed by drying under reduced pressure at a temperature of 160° C. for 24 hours. To the resultant white solid, distilled water (100 mL) and concentrated hydrochloric acid (100 mL) were added, and heated under stirring for 3 hours. The resultant white solid was collected by filtration, followed by heating within a temperature range of 180 to 190° C. for three hours to obtain a yellow solid.

Yield: 7.8 g

Percent yield: 71.9%

Melting point: 175.2° C. (DSC)

FT-IR (KBr, cm$^{-1}$): 1847.5, 1778.0, 1604.4, 1473.3, 1326.8, 1257.4, 902.5, 817.7, 732.0

$^1$H-NMR (300 MHz, DMSO-d$_6$, ppm): 7.45-7.49 (d, 4H), 7.52-7.55 (d, 4H), 7.56 (s, 2H), 7.60-7.63 (d, 2H), 7.83-7.85 (d, 2H)

Elemental analysis:

Calculated value $C_{28}H_{14}O_6S_3$: C, 61.98%; H, 2.60%.

Found value C, 62.23%; H, 2.97%.

Preparation Examples of Composition Containing No Particle Component

Example 1

In a reaction vessel equipped with a nitrogen gas-introduction tube, N-methyl-2-pyrrolidone (80 g) (hereinafter referred to as NMP) was added to 4,4'-thiodianiline (8.65 g, 40 mmol) (hereinafter referred to as SDA), and the mixture was stirred at room temperature to dissolve SDA completely. Then, 4,4'-[p-thiobis(phenylene-sulfanyl)]diphthalic anhydride (21.70 g, 40 mmol) (hereinafter referred to as 3SDEA) and NMP (25 g) were added thereto, and stirred at room temperature for 24 hours to obtain a NMP solution of the polyamic acid.

Examples 2 to 6

NMP solutions of the polyamic acid were prepared by polymerization in the same manner as in Example 1 except that, instead of 3SDEA used in Example 1, acid anhydride indicated in Table 1 was used.

Example 7

In a reaction vessel equipped with a nitrogen gas-introduction tube, N-methyl-2-pyrrolidone (80 g) (hereinafter referred to as NMP) was added to 4,4'-(p-phenylenedisulfanyl)dianiline (12.98 g, 40 mmol) (hereinafter referred to as 2SPDA), and the mixture was stirred at room temperature to dissolve 2SPDA completely. Then, 4,4'-[p-thiobis(phenylene-sulfanyl)]diphthalic anhydride (21.70 g, 40 mmol) (hereinafter referred to as 3SDEA) and NMP (25 g) were added thereto, and the mixture was stirred at room temperature for 24 hours to obtain a NMP solution of the polyamic acid.

Examples 8 to 12

NMP solutions of the polyamic acid were prepared by polymerization in the same manner as in Example 1 except that, instead of 3SDEA used in Example 7, acid anhydride indicated in Table 1 was used.

Example 13

In a reaction vessel equipped with a nitrogen gas-introduction tube, N-methyl-2-pyrrolidone (80 g) (NMP) was added to 4,4'-thiobis[(p-phenylenesulfanyl)aniline] (17.30 g, 40 mmol) (hereinafter referred to as 3SDA), and the mixture was stirred at room temperature to dissolve 3SDA completely. Then, 4,4'-[p-thiobis(phenylene-sulfanyl)]diphthalic anhydride (21.70 g, 40 mmol) (3SDEA) and NMP (25 g) were added thereto, and the mixture was stirred at room temperature for 24 hours to obtain a NMP solution of the polyamic acid.

Examples 14 to 18

NMP solutions of the polyamic acid were prepared by polymerization in the same manner as in Example 1 except that, instead of 3SDEA used in Example 13, an acid anhydride indicated in Table 1 was used.

Example 19

In a reaction vessel equipped with a nitrogen gas-introduction tube, N-methyl-2-pyrrolidone (80 g) (NMP) was added to 4,4'-bis(4-aminophenylsulfanyl)-p-dithiophenoxybenzene (21.60 g, 40 mmol) (hereinafter referred to as 4SDA), and the mixture was stirred at room temperature to dissolve 4SDA completely. Then, 4,4'-[p-thiobis(phenylene-sulfanyl)]diphthalic anhydride (21.70 g, 40 mmol) (3SDEA) and NMP (25 g) were added thereto, and the mixture was stirred at room temperature for 24 hours to obtain a NMP solution of the polyamic acid.

Examples 20 and 21

NMP solutions of the polyamic acid were prepared by polymerization in the same manner as in Example 1 except that, instead of 3SDEA used in Example 19, an acid anhydride indicated in Table 1 was used.

Example 22

In a reaction vessel equipped with a nitrogen gas-introduction tube, N-methyl-2-pyrrolidone (80 g) (NMP) was added to 1,3-bis(4-aminophenylsulfanyl)benzene (12.98 g, 40 mmol) (hereinafter referred to as m2SDA), and the mixture was stirred at room temperature to dissolve m2SDA completely. Then, 1,2,3,4-cyclobutane tetracarboxylic dianhydride (7.84 g, 40 mmol) (CBDA) and NMP (25 g) were added thereto, and the mixture was stirred at room temperature for 24 hours to obtain a NMP solution of the polyamic acid.

Example 23

In a reaction vessel equipped with a nitrogen gas-introduction tube, N-methyl-2-pyrrolidone (80 g) (NMP) was added to 1,3-bis(4-aminophenolsulfanyl)-5-cyanobenzene (13.98 g, 40 mmol) (hereinafter referred to as CySDA), and the mixture was stirred at room temperature to dissolve CySDA completely. Then, 1,2,3,4-cyclobutane tetracarboxylic dianhydride (7.84 g, 40 mmol) (CBDA) and NMP (25 g) were added thereto, and the mixture was stirred at room temperature for 24 hours to obtain a NMP solution of the polyamic acid.

Comparative Example 1

In a reaction vessel equipped with a nitrogen gas-introduction tube, N-methyl-2-pyrrolidone (80 g) (NMP) was added to bis(p-aminophenyl)ether (8.01 g, 40 mmol) (hereinafter referred to as ODA), and the mixture was stirred at room temperature to dissolve ODA completely. Then, CBDA (7.84 g, 40 mmol) and NMP (25 g) were added thereto, and the mixture was stirred at room temperature for 24 hours to obtain a NMP solution of the polyamic acid.

<Preparation of Cured Film>

Each of the NMP solutions of the polyamic acid prepared in Examples 1 to 23 and Comparative Example 1 was dispensed on a fused silica substrate having a diameter of 3 inches and a thickness of 3 mm, followed by spin coating to form a film having a thickness of about 1 to 10 μm. The film was then heated under a nitrogen atmosphere at a temperature of 280° C. for 1.5 hours to obtain a cured film.

Figure 1:
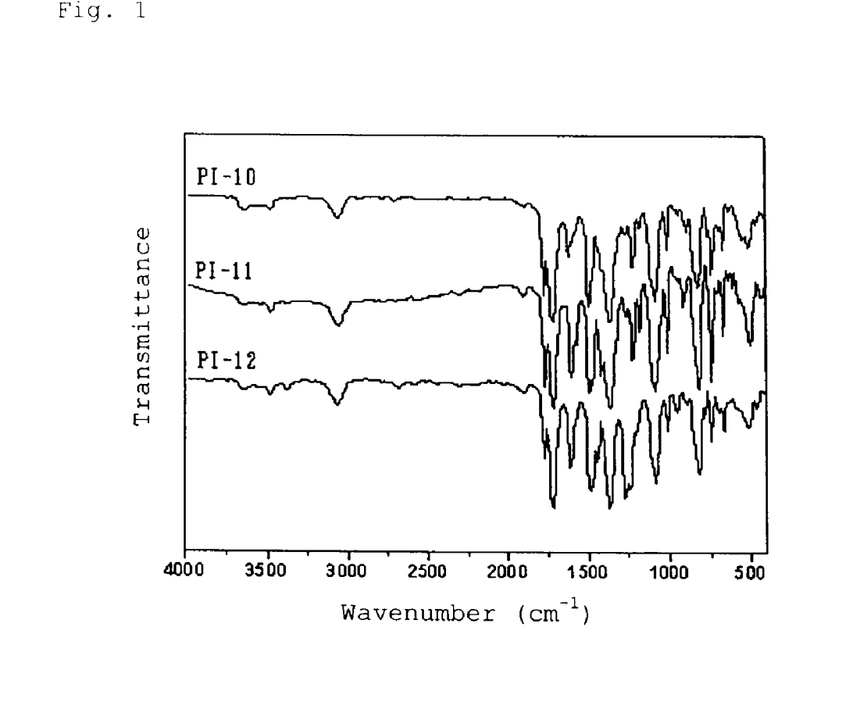
FIG. 1 shows FT-IR charts of the imidization polymers in the cured films obtained by curing the composition of Examples 10 to 12 (indicated as PI-10 to PI-12, respectively).
Figure 2:
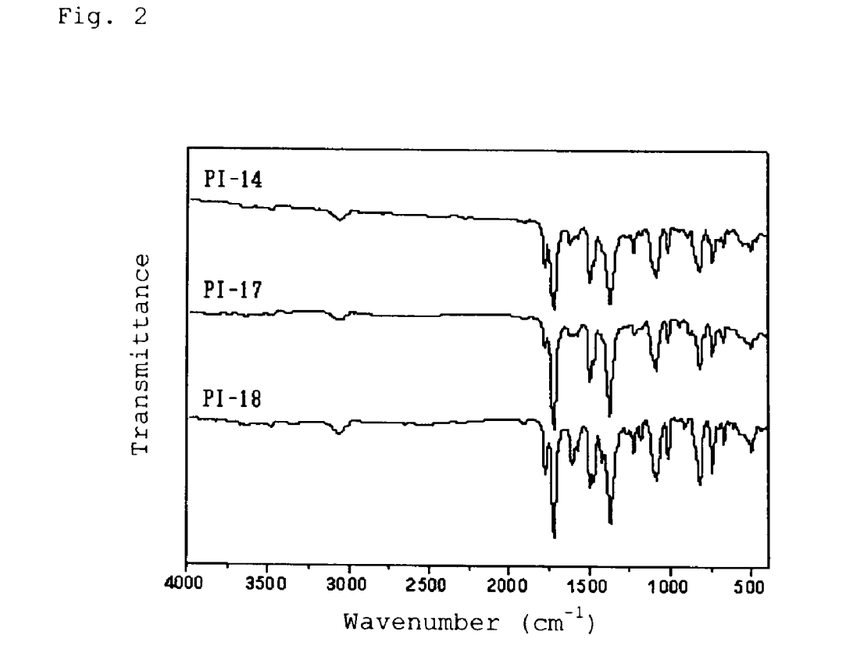
FIG. 2 shows FT-IR charts of the imidization polymers in the cured films obtained by curing the composition of Examples 14, 17 and 18 (indicated as PI-14, 17 and 18, respectively).

FIG. 1 shows FT-IR charts of the imidization polymers obtained by curing the compositions of Examples 10, 11 and 12 (they are indicated as PI-10 to PI-12 in FIG. 1, respectively). Also, FIG. 2 shows FT-IR charts of the imidization polymer obtained by curing the compositions of Examples 14, 17 and 18 (they are indicated as PI-14, PI-17 and PI-18 in FIG. 2, respectively).

<Property Evaluation on Cured Film>

The cured films formed as above were measured and evaluated with respect to the following properties. Table 1 shows the results.

(1) Refractive Index

By using a PC-2000 model prism coupler manufactured by Metricon Corporation, a refractive index at a wavelength of 633 nm was measured.

(2) Transmittance

By using a U-3500 type automatic recording spectrophotometer manufactured by Hitachi Ltd., transmittances (%) per a thickness of 1 μm of the cured film obtained above were measured at wavelengths of 400 nm and 450 nm, respectively.

(3) Heat Resistance

By using DSC6300 (programming rate of 10° C. per minute under a nitrogen current) manufactured by Seiko Instruments, Inc., a 5% weightless temperature of the cured film obtained above was measured. When the 5% weightloss temperature was 400° C. or higher, heat resistance was evaluated as good.

TABLE 1

| | Diamine | Acid anhydride | Polyamic acid content (wt %) | Refractive index at 633 nm | Transmittance (%)/ Film thickness 1 μm | | Heat resistance | Film thickness (μm) |
| --- | --- | --- | --- | --- | --- | --- | --- | --- |
| | | | | | at 400 nm | at 450 nm | | |
| Ex. 1 | SDA | 3SDEA | 20.0 | 1.744 | 12 | 80 | ◯ | 6.5 |
| Ex. 2 | SDA | CBDA | 20.0 | 1.653 | >95 | >95 | ◯ | 2.2 |
| Ex. 3 | SDA | CHDA | 20.0 | 1.636 | >95 | >95 | ◯ | 2.2 |
| Ex. 4 | SDA | sBPDA | 20.0 | 1.734 | 71 | 81 | ◯ | 3.0 |
| Ex. 5 | SDA | aBPDA | 20.0 | 1.707 | 70 | 82 | ◯ | 4.6 |
| Ex. 6 | SDA | ODPA | 20.0 | 1.707 | 80 | 90 | ◯ | 5.4 |
| Ex. 7 | 2SPDA | 3SDEA | 20.0 | 1.717 | 13 | 74 | ◯ | 10.0 |
| Ex. 8 | 2SPDA | CBDA | 20.0 | 1.665 | >95 | >95 | ◯ | 5.8 |
| Ex. 9 | 2SPDA | CHDA | 20.0 | 1.667 | >95 | >95 | ◯ | 6.2 |
| Ex. 10 | 2SPDA | sBPDA | 20.0 | 1.729 | 10 | 75 | ◯ | 16.0 |
| Ex. 11 | 2SPDA | aBPDA | 20.0 | 1.717 | 58 | 70 | ◯ | 6.2 |
| Ex. 12 | 2SPDA | ODPA | 20.0 | 1.712 | 82 | 91 | ◯ | 4.1 |
| Ex. 13 | 3SDA | 3SDEA | 20.0 | 1.748 | 14 | 83 | ◯ | 3.7 |
| Ex. 14 | 3SDA | CBDA | 20.0 | 1.695 | >95 | >95 | ◯ | 5.0 |
| Ex. 15 | 3SDA | CHDA | 20.0 | 1.680 | >95 | >95 | ◯ | 3.0 |
| Ex. 16 | 3SDA | TCA | 20.0 | 1.695 | >95 | >95 | ◯ | 4.1 |
| Ex. 17 | 3SDA | sBPDA | 20.0 | 1.735 | 11 | 83 | ◯ | 9.1 |
| Ex. 18 | 3SDA | ODPA | 20.0 | 1.719 | 85 | 92 | ◯ | 12.1 |

TABLE 1-continued

| | Diamine | Acid anhydride | Polyamic acid content (wt %) | Refractive index at 633 nm | Transmittance (%)/Film thickness 1 μm at 400 nm | Transmittance (%)/Film thickness 1 μm at 450 nm | Heat resistance | Film thickness (μm) |
|---|---|---|---|---|---|---|---|---|
| Ex. 19 | 4SDA | 3SDEA | 20.0 | 1.755 | 9 | 69 | ○ | 8.3 |
| Ex. 20 | 4SDA | CBDA | 20.0 | 1.712 | >95 | >95 | ○ | 4.5 |
| Ex. 21 | 4SDA | CHDA | 20.0 | 1.705 | >95 | >95 | ○ | 5.1 |
| Ex. 22 | m2SDA | CBDA | 20.0 | 1.654 | >95 | >95 | ○ | 7.8 |
| Ex. 23 | CySDA | CBDA | 20.0 | 1.644 | >95 | >95 | ○ | 6.8 |
| Comp. Ex. 1 | ODA | CBDA | 20.0 | 1.567 | >95 | >95 | ○ | 5.7 |

Abbreviations in Table 1 indicate the following materials:
(Diamines)
SDA: 4,4'-thiodianiline
2SPDA: 4,4'-(p-phenylene disulfanyl)dianiline; Synthesis Example 1
3SDA: 4,4'-thiobis[(p-phenylene sulfanyl)aniline]; Synthesis Example 5
4SDA: 4,4'-bis(4-aminophenylsulfanyl)-p-dithiophenoxybenzene; Synthesis Example 6
m2SDA: 1,3-bis(4-aminophenylsulfanyl)benzene; Synthesis Example 2
CySDA: 1,3-bis(4-aminophenolsurfanyl)-5-cyanobenzene; Synthesis Example 3
ODA: bis(p-aminophenyl) ether (Acid anhydrides)
3SDEA: 4,4'-[p-thiobis(phenylene-sulfanyl)]diphthalic anhydride; Synthesis Example 7
CBDA: 1,2,3,4-cyclobutane tetracarboxylic dianhydride
CHDA: 1,2,4,5-cyclohexane tetracarboxylic dianhydride
sBPDA: 3,3',4,4'-biphenyl tetracarboxylic dianhydride
aBPDA: 2,3',3,4'-biphenyl tetracarboxylic dianhydride
ODPA: 4,4'-oxydiphthallic dianhydride
TCA: 4,10-dioxanetricyclo[6.3.1.0$^{2,7}$]dodecan-3,5,9,11-tetraone From the results shown in Table 1, the imidization polymer obtained by curing the polyamic acid having the structure represented by the general formula (1) has a significantly high refractive index of 1.636 to 1.755, significantly high transmittances at wavelengths of 400 nm and 450 nm, and excellent heat resistance. Therefore, it is understood that the polyamic acid is useful as a material for preparing optical parts for which a high refractive index and excellent heat resistance are required.

Preparation Examples of Composition containing Particle Component

Example 24

In a reaction vessel equipped with a nitrogen gas-introduction tube, 59.53 g of a mixed solvent of cyclohexanone, ethyl lactate and 2-butoxyethanol (weight ratio: 3/0.5/0.5) and 0.11 g of a dimethylpolysiloxane-polyoxyalkylene copolymer (SH28PA, surfactant manufactured by Daw Corning Toray Co., Ltd.) were added to 28.88 g of the NMP solution of polyamic acid prepared in Example 13 (polyamic acid content of 20% by weight), and were dissolved. Then, 17.12 g of silicon oxide-coated anatase type titanium oxide-methanol sol (Optorake, manufactured by Catalyst & Chemicals Ind. Co., Ltd., particle content of 25% by weight) was added dropwise thereto. Then, the mixture was stirred at room temperature for one hour to obtain a high-refractive index resin composition.

Examples 25 to 31 and Comparative Examples 2 to 4

High-refractive index resin compositions were obtained in the same manner as in Example 24 except that the composition was changed as indicated in Table 2.

<Preparation of Cured Film>

Each of the high-refractive index resin compositions prepared in Examples 24 to 31 and Comparative Example 2 was dispensed on a silicon wafer having a diameter of 4 inches, followed by spin coating to form a film having a thickness of approximately 0.3 μm. The film was cured under a nitrogen atmosphere at a temperature of 280° C. for 1.5 hours to obtain a cured film.

<Property Evaluation of Cured Film>

The following properties were measured and evaluated with respect to the cured film formed as above. Table 2 shows the results.

(1) Refractive Index

By using N&K Analyzer manufactured by N&K Technology Inc., a refractive index at a wavelength of 633 nm at a temperature of 25° C. was measured.

(2) Transmittance

By using a V-570 type spectrophotometer manufactured by JASCO Corporation, a transmittance was measured at a wavelength of 400 nm.

TABLE 2

| Component | Composition (% by weight) | Refractive Index at 633 nm | Ex. 24 | Ex. 25 | Ex. 26 | Ex. 27 | Ex. 28 | Ex. 29 |
|---|---|---|---|---|---|---|---|---|
| (A) | Polyamic acide of Ex. 13 | 1.748 | 54.5 | — | — | — | — | — |
| | Polyamic acide of Ex. 14 | 1.695 | — | 54.5 | 54.5 | 54.5 | — | — |
| | Polyamic acide of Ex. 15 | 1.680 | — | — | — | — | 54.5 | 49.5 |
| | Polyamic acide of Ex. 16 | 1.695 | — | — | — | — | — | — |
| | Polyamic acide of Comp. Ex. 1 | 1.567 | — | — | — | — | — | — |

TABLE 2-continued

|   | Component | Composition (% by weight) | Refractive Index at 633 nm | | | | | |
|---|---|---|---|---|---|---|---|---|
| (B) | | Silicon oxide-coated anatase type titanium oxide (Primary particle diameter: 5 to 15 nm) | 2.0 | 44.6 | 44.6 | — | — | 44.6 | 49.5 |
| | | Silicon oxide-coated tin oxide-containing rutile type tianium oxide (Primary particle diameter: 5 to 15 nm) | 2.4 | — | — | 44.6 | — | — | — |
| | | Zirconium oxide (Primary particle diameter: 5 to 20 nm) | 1.9 | — | — | — | 44.6 | — | — |
| (D) | | Surfactant (SH28PA) | | 0.99 | 0.99 | 0.99 | 0.99 | 0.99 | 0.99 |
| Total solid content | | | | 100.0 | 100.0 | 100.0 | 100.0 | 100.0 | 100.0 |
| (E) | | Cyclohexanone | | 408.5 | 408.5 | 408.5 | 459.0 | 408.5 | 435.0 |
| | | Ethyl lactate | | 68.2 | 68.2 | 68.2 | 76.9 | 68.2 | 72.5 |
| | | 2-Butoxyethanol | | 68.2 | 68.2 | 68.2 | 76.9 | 68.2 | 72.5 |
| | | MNP (Solvent of polyamic acid) | | 220.0 | 220.0 | 220.0 | 219.8 | 220.0 | 80.0 |
| | | Methanol (Dispersion medium of particles) | | 135.1 | 135.1 | 135.1 | — | 135.1 | 240.0 |
| | | Methyl ethyl ketone (Dispersion medium of particles) | | — | — | — | 67.4 | — | — |
| Total | | | | 1000.0 | 1000.0 | 1000.0 | 1000.0 | 1000.0 | 1000.0 |
| Solid content (% by weight) | | | | 10.0 | 10.0 | 10.0 | 10.0 | 10.0 | 10.0 |
| <Property evaluation of cured film> | | | | | | | | | |
| Refractive index (at 633 nm) | | | | 1.858 | 1.812 | 1.832 | 1.743 | 1.752 | 1.814 |
| Transmittance (%) (at 400 nm) | | | | 75 | >95 | >95 | >95 | >95 | >95 |

|   | Component | Composition (% by weight) | Refractive Index at 633 nm | Ex. 30 | Ex. 31 | Ex. 32 | Ex. 33 | Comp. Ex. 2 |
|---|---|---|---|---|---|---|---|---|
| (A) | | Polyamic acide of Ex. 13 | 1.748 | — | — | — | — | — |
| | | Polyamic acide of Ex. 14 | 1.695 | — | — | — | — | — |
| | | Polyamic acide of Ex. 15 | 1.680 | 44.6 | 29.7 | 19.8 | — | — |
| | | Polyamic acide of Ex. 16 | 1.695 | — | — | — | 54.5 | — |
| | | Polyamic acide of Comp. Ex. 1 | 1.567 | — | — | — | — | 54.5 |
| (B) | | Silicon oxide-coated anatase type titanium oxide (Primary particle diameter: 5 to 15 nm) | 2.0 | 54.5 | 69.3 | 79.2 | 44.6 | 44.6 |
| | | Silicon oxide-coated tin oxide-containing rutile type tianium oxide (Primary particle diameter: 5 to 15 nm) | 2.4 | — | — | — | — | — |
| | | Zirconium oxide (Primary particle diameter: 5 to 20 nm) | 1.9 | — | — | — | — | — |
| (D) | | Surfactant (SH28PA) | | 0.99 | 0.99 | 0.99 | 0.99 | 0.99 |
| Total solid content | | | | 100.0 | 100.0 | 100.0 | 100.0 | 100.0 |
| (E) | | Cyclohexanone | | 372.3 | 435.0 | 435.0 | 408.5 | 408.5 |
| | | Ethyl lactate | | 75.7 | 72.5 | 72.5 | 68.2 | 68.2 |
| | | 2-Butoxyethanol | | 75.7 | 72.5 | 72.5 | 68.2 | 68.2 |
| | | MNP (Solvent of polyamic acid) | | 196.3 | 80.0 | 80.0 | 220.0 | 220.0 |
| | | Methanol (Dispersion medium of particles) | | 180.0 | 240.0 | 240.0 | 135.1 | 135.1 |
| | | Methyl ethyl ketone (Dispersion medium of particles) | | — | — | — | — | — |
| Total | | | | 1000.0 | 1000.0 | 1000.0 | 1000.0 | 1000.0 |
| Solid content (% by weight) | | | | 10.0 | 10.0 | 10.0 | 10.0 | 10.0 |
| <Property evaluation of cured film> | | | | | | | | |
| Refractive index (at 633 nm) | | | | 1.813 | 1.664 | 1.645 | 1.803 | 1.68 |
| Transmittance (%) (at 400 nm) | | | | >95 | 72 | 70 | >95 | >95 |

Abbreviations in Table 2 indicate the following matters:
Silicon oxide-coated anatase type titanium oxide: particle-methanol sol, Optorake, manufactured by Catalyst & Chemicals Ind. Co., Ltd.; primary particle diameter of 5 to 15 nm, particle content of 25% by weight
Silicon oxide-coated tin oxide-containing rutile type titanium oxide: particle-methanol sol, TS series, manufactured by TAYKA Coproration; primary particle diameter of 5 to 15 nm, particle content of 20% by weight
Zirconium oxide: particle-methyl ethyl ketone sol, HXU-120JC, manufactured by Sumitomo Osaka Cement Co., Ltd.; primary particle diameter of 5 to 20 nm, particle content of 40% by weight
SH28PA: surfactant, manufactured by Dow Corning Toray Co., Ltd.; dimethyl polysiloxane polyoxyalkylene copolymer From the results shown in Table 2, it is understood that by addition of the (B) particle component, a cured film having such an extremely high refractive index of 1.743 to 1.858 and high transmittance for which optical parts require can be obtained.

INDUSTRIAL APPLICABILITY

The curable composition of the invention is useful as a material for preparing optical parts for which a high refractive index, high transparency and further high heat resistance are required.

The optical part of the invention is useful as high reflecting materials and coating materials for a high-refractive index part of an antireflection film, and as materials to increase sensitivity of a light guide, various lenses, a solid-state image sensing device and a recording disk.

The invention claimed is:

1. A resin composition comprising:
   (A) at least one polyamic acid having the structure represented by the following general formula (1):

where $R^1$ is independently an alkyl group having 1 to 3 carbon atoms or a cyano group; a is independently an integer of 0 to 4; R is selected from the group consisting of tetravalent alicylic groups containing a sulfur atom and tetravalent aliphatic groups containing a sulfur atom; n is an integer of 1 to 4; and m is an integer of 1 to 100,000, and
   (E) an organic solvent.

2. The resin composition according to claim 1, wherein the composition further comprises (B) particles which are formed mainly of an oxide of an element belonging to Group IV in the periodic table and have a primary particle size within a range of 1 to 100 nm.

3. The resin composition according to claim 2, wherein the particles of the component (B) are formed of titanium oxide or zirconium oxide.

4. The resin composition according to claim 2, wherein the particles of the component (B) are formed of titanium oxide coated with silicon oxide.

5. The resin composition according to any one of claim 1, wherein the composition further comprises (C) a surfactant.

6. The resin composition according to claim 1, wherein the composition further comprises (D) an imidization catalyst.

7. The resin composition according to claim 6, wherein the (D) imidization catalyst is a photo acid generator or a photo base generator.

8. The resin composition according to claim 1, wherein the composition further comprises a polyamic acid other than the polyamic acid having the structure represented by the general formula (1).

9. A cured film obtainable by heating the resin composition according to claim 1.

10. The cured film according to claim 9, wherein the refractive index measured at a temperature of 25° C. at a wave length of 633 nm is 1.60 or higher.

11. A cured film comprising an imidization polymer having the structure represented by the following general formula (2):

wherein $R^1$ is independently an alkyl group having 1 to 3 carbon atoms or a cyano group;
   a is independently an integer of 0 to 4; R is selected from the group consisting of tetravalent alicylic groups containing a sulfur atom and tetravalent aliphatic groups containing a sulfur atom; n is an integer 1 to 4; and m is an integer of 1 to 100,000.

12. An optical part made of the cured film according to claim 9.

13. The optical part according to claim 12, for a condensing material of a solid-state image sensing device.

14. The optical part according to claim 12, for a condensing material of a recording disk.

15. The cured film according to claim 11, wherein the refractive index measured at a temperature of 25° C. at a wave length of 633 nm is 1.60 or higher.

16. The cured film according to claim 11, wherein the refractive index measured at a temperature of 25 ° C. at a wave length of 633 nm is 1.68 or higher.

17. The cured film according to claim 11, wherein the refractive index measured at a temperature of 25° at a wave length of 633 nm is 1.70 or higher.

18. The cured film according to claim 11, wherein the thickness of the film is 01. to 5 μm.

* * * * *